United States Patent
Ravindranath et al.

(10) Patent No.: US 9,785,360 B1
(45) Date of Patent: Oct. 10, 2017

(54) ADAPTIVE AND DYNAMIC MIXED READ/WRITE INPUT/OUTPUT BALANCER

(71) Applicant: EMC IP Holding Company LLC, Hopkinton, MA (US)

(72) Inventors: Anil Ravindranath, Sunnyvale, CA (US); Krishna Gudipati, Santa Clara, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 251 days.

(21) Appl. No.: 14/753,452

(22) Filed: Jun. 29, 2015

(51) Int. Cl.
*G06F 12/00* (2006.01)
*G06F 3/06* (2006.01)

(52) U.S. Cl.
CPC .......... *G06F 3/0611* (2013.01); *G06F 3/0659* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 6,725,456 B1* | 4/2004 | Bruno | G06F 9/5011 709/222 |
| 6,748,282 B2* | 6/2004 | Lin | G05B 19/4189 438/5 |
| 6,944,730 B2* | 9/2005 | Lai | G06F 13/161 711/154 |
| 7,779,010 B2* | 8/2010 | McGarvey | G06F 17/30584 707/639 |
| 8,036,373 B2* | 10/2011 | Shaffer | H04M 3/4938 379/266.06 |
| 8,243,745 B2* | 8/2012 | Endo | H04L 49/90 370/412 |
| 8,392,633 B2* | 3/2013 | Gulati | G06F 9/5011 710/36 |
| 9,645,848 B2* | 5/2017 | Jamjoom | G06F 9/4881 |

\* cited by examiner

*Primary Examiner* — Cheng-Yuan Tseng
(74) *Attorney, Agent, or Firm* — Staniford Tomita LLP (57) ABSTRACT

Embodiments are directed to a method of optimizing input/output (I/O) operations to a storage device having mixed read and write operations by determining a current queue state for the read and write operations with respect to defined optimum values of I/O operations per second (IOPS) and latency for the I/O operations, determining device characteristics of the storage device by determining read/write response times, queue depths and dispatch time intervals for an initial read/write operation, and modifying at least one of a wait time or batch size for subsequent read/write operations to meet the defined optimum values of IOPS and latency.

18 Claims, 10 Drawing Sheets

| MIXED WORKLOAD | DESIRED IOPS | DESIRED LATENCY | ACHIEVED IOPS | ACHIEVED LATENCY | CURRENT Q STATE |
|---|---|---|---|---|---|
| Read | 60K | 200 us | 40K | 2ms | READ_IOPS_MET LAT_NOT_MET |
| Write | 70K | 2ms | 70K | 1ms | WRITE_IOPS_MET LAT_EXCEED |

ADAPTIVE AND DYNAMIC MIXED READ/WRITE INPUT/OUTPUT BALANCER

TECHNICAL FIELD

Embodiments are generally directed to data storage I/O operations, and more specifically to optimizing read/write performance for memory access operations.

BACKGROUND

Read and write operations to disk and other memory devices are generally efficient when they are sent individually to the disk, that is, all reads are sent separately from the writes. When a mixed workload of reads and writes are sent, however, very poor read performance can occur. This is generally due to the fact that write operations require longer disk service times due to internal operations of remapping, garbage collection, or internal buffer size shortages in the disk for write workloads in the I/O device. This results in higher latencies and lower IOPS (I/O operations per second) for read workloads causing significant delays to applications. This issue is applicable to all types of I/O devices, but is even more prevalent in high speed devices, such as flash memory, solid state disks (SSDs), and so on. As an example, consider that read operations may require 200 to 400 microseconds to complete, while write operations may require on the order of 2 to 5 milliseconds to complete. There is thus about an order of magnitude difference between the IOPS rate between read and write operations. For a series of operations that are consecutive writes (W-W-W- . . . W) or reads (R-R-R- . . . R), the difference in latency has no effect. However, if read operations are interleaved with writes (e.g., W-R-W-W-R-W-R- . . . ), the writes will stall at least some of the reads due to this significant difference in latency.

What is needed, therefore, is a system and method for dynamically balancing reads and writes with a device adaptive method. The solution should be device agnostic and applicable to all devices that require reads and writes to be balanced. What is further needed is a solution that can be extended to mixed client (applications) scenarios where each client sends reads and writes with varied request sizes and different performance expectancy numbers.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup related processes executed in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a processing component in or associated with a backup server or memory controller that dynamically balances reads and writes using storage device characteristics to meet desired IOP and latency figures. The solution is device agnostic and can be applied all the devices which require read and write operations to be balanced so that operation throughput is optimized for particular applications or client computer processes involving data storage accesses through read/write operations. The process can be configured to support mixed client (application) scenarios where each client sends reads/writes with varied request size and different performance expectancy numbers.

Figure 1:
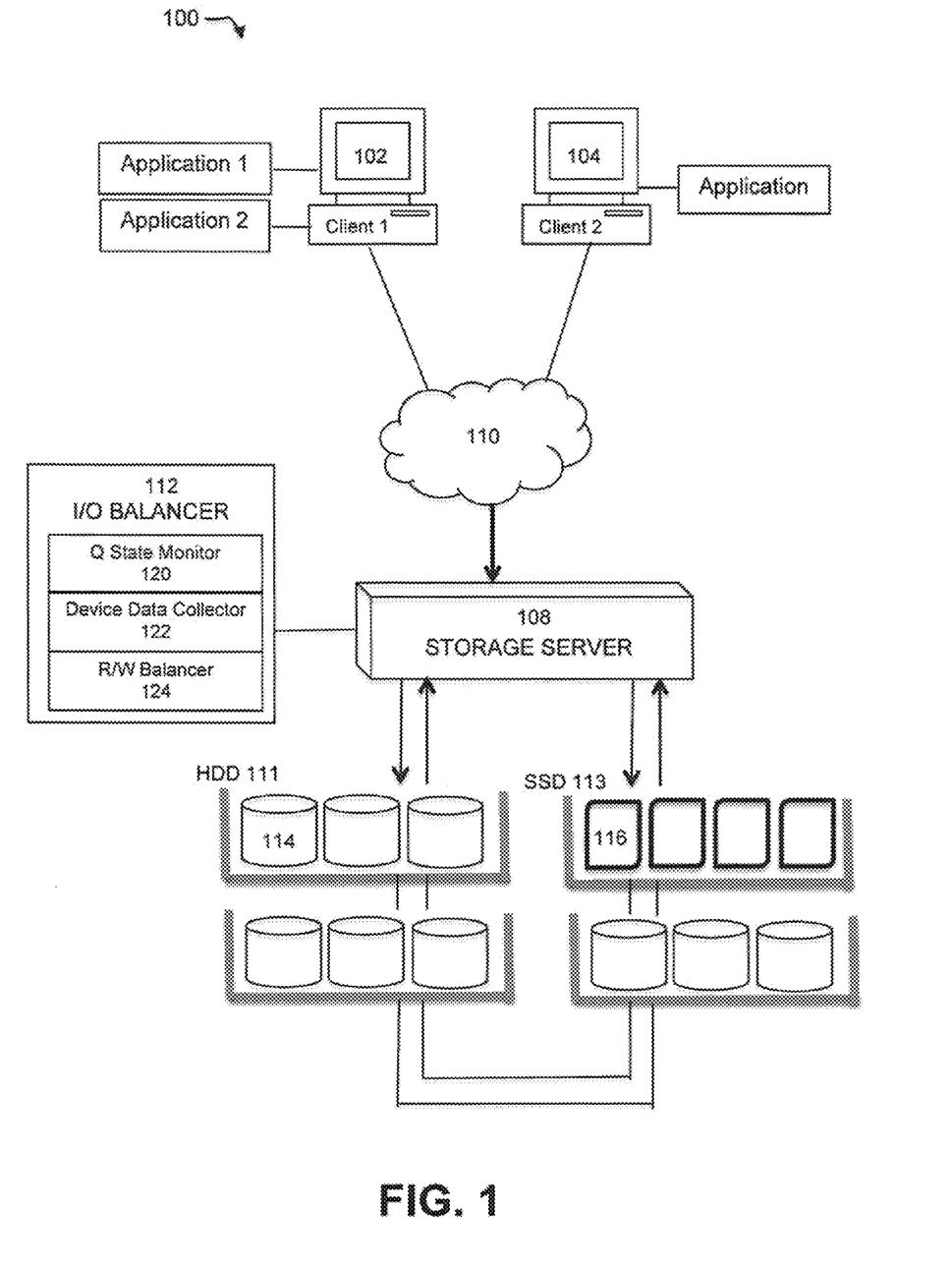
FIG. 1 illustrates a data storage system 100 that implements one or more embodiments of an adaptive I/O balancer for mixed read/write operations to SSD and HDD devices, under some embodiments.

FIG. 1 illustrates a data storage system 100 that implements one or more embodiments of an adaptive I/O balancer for mixed read/write operations to storage devices including SSD and HDD devices, under some embodiments. As shown in system 100, one or more client computers 102 and 104 execute one or more applications. Each application generates read/write requests to process data stored on data storage devices such as hard disk drives (HDD) 111, solid state drives (SSD) 113, or other appropriate storage devices. The client computer(s) may access the data storage devices through a network 110, such as the Internet, cloud, WAN, LAN, and other types of networks.

In system 100, a backup or storage server 108 executes a backup management process 112 that coordinates or manages the backup of data from one or more data sources (e.g., clients 102, 104 to the storage devices including SSDs 113 and HDDs 111. The storage devices may serve as network storage devices or target storage devices for data backed up in large-scale data backup operations. They may comprise arrays of disks or memory devices and may be arranged in the form of multi-memory shelves, such as in enterprise or large-scale data storage facilities. For the example of FIG. 1, HDD shelf 111 may comprise a number of individual hard disk devices 114 and SSD shelf 113 may comprise a number of individual solid state disk devices 116. Any number and arrangement of SSD, HDD, and respective shelves may be provided, and aspects of the I/O balancing process may be scaled to work with single storage devices, medium size arrays, or large-scale mixed media arrays.

The data stored, accessed or processed by the client computers and the applications may be any appropriate type of data, such as database data that is part of a database management system. In this case, the data may reside on one or more storage devices (HDD or SSD) and may be stored in the database in a variety of formats. One example is an Extensible Markup Language (XML) database, which is a data persistence software system that allows data to be stored in XML format. Another example is a relational database management system (RDMS) which uses tables to store the information. Any of the applications or client computers may represent a database server that instantiates a program that interacts with the database.

The storage server and client computers may be coupled directly or indirectly to each other through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application; and the network may include one or more virtual machines (VMs) with each VM representing virtual clients that may be supported by one or more servers within each VM, or other type of centralized network server.

The data generated or sourced by system 100 is generally stored in any number of persistent storage locations and devices, such as one or more of the HDD 114 or SSD 116 devices or shelves 111, 113. The storage server 108 executes a backup process that causes or facilitates the backup of the application data the storage devices of the network, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114 and 116. The HDD devices 114 may be large capacity disk (optical or magnetic) arrays, and the SDD devices 116 may be any appropriate solid state device such as flash memory.

The storage server 108 may implement certain backup processes such as de-duplication processes. In an embodiment the storage server is embodied as a data domain replicator (DDR) device provided by EMC Corporation of Hopkinton, Mass.

For the embodiment of FIG. 1, system 100 includes an I/O balancer process 112 that dynamically balances reads and writes issued by an application using a device adaptive method. The solution is device agnostic and can be applied all the devices which require reads and writes to be balanced due to any adverse effect on read operations due to excessive IOPs and latencies of the writes. The I/O balancer process 112 includes a number of functional components or sub-processes including a Q state monitor 120, a device data collector 122, and a read/write balancer 124.

Figure 2:
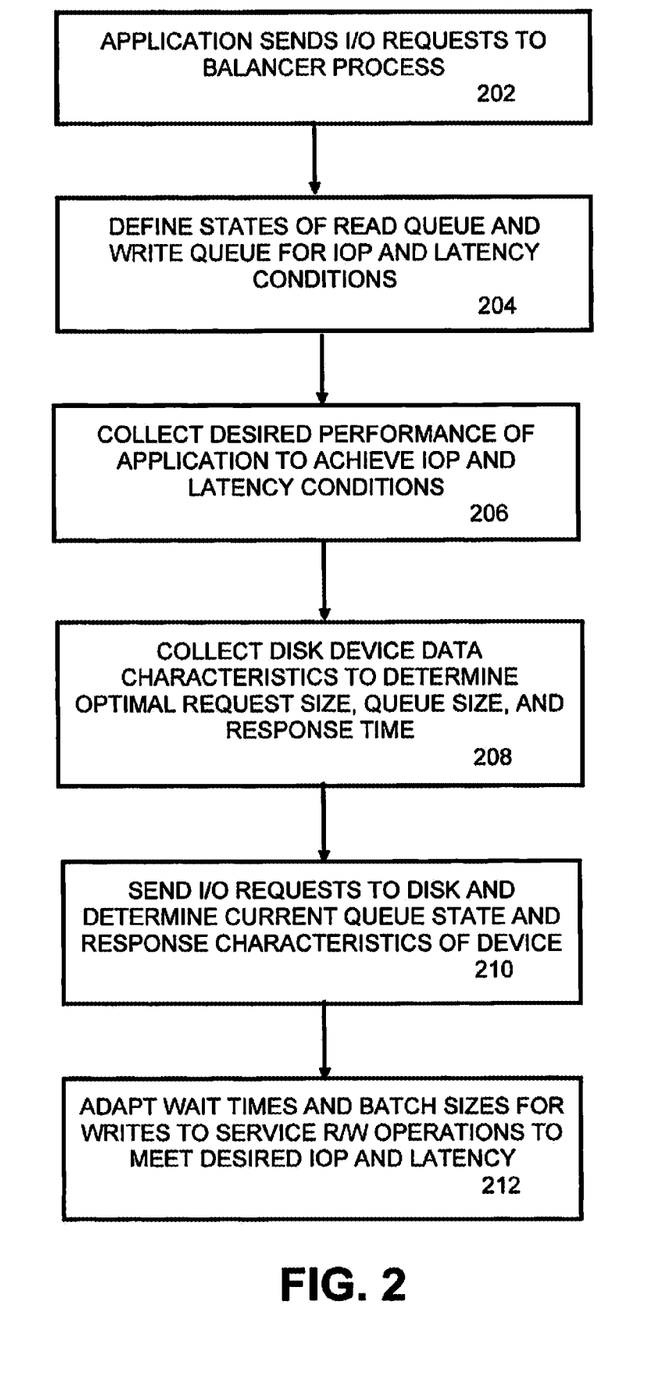
FIG. 2 is a flowchart that illustrates a method of dynamic and adaptively balancing I/O requests, under an embodiment.

FIG. 2 is a flowchart that illustrates a method of dynamic and adaptively balancing I/O requests, under an embodiment. The flowchart of FIG. 2 illustrates the general process flow for the overall process executed by the balancer component 112 and other elements of the storage server 108, and further details regarding individual processes will be described in greater detail below. As shown in FIG. 1, the process starts 202 when an application sends I/O requests (reads and writes) to the balancer, block 112. The balancer maintains two processing queues, one for read and one for write. More queues can be created and maintained if necessary depending on system constraints and requirements, such as if multiple applications and/or multiple clients are to be supported. The process defines the states of the read queue and the write queue with regard to whether IOPs and latencies are met for the I/O requests sent by the application, block 204. The process next collects the desired performance of the application from the disk to achieve the IOP and latency conditions, block 206. The process collects I/O disk device data characteristics to determine optimal request size, queue size and operation response time, block 208. The storage server then sends the IO requests to the storage devices and determines the current queue state, block 210. It also gets the response characteristics from the device. Based on the current queue state and initial device response characteristics, the balancer 112 adapts itself with equations, manages the wait times and batch sizes for writes to service the reads and writes efficiently and achieve the application's desired IOPs and latency, block 212. In this manner, the balancer process is adaptive and dynamic based on the characteristics of the storage devices. As such, it provides significant advantages over prior methods that are not adaptive, dynamically changeable at run time and are not device agnostic.

Figure 3:
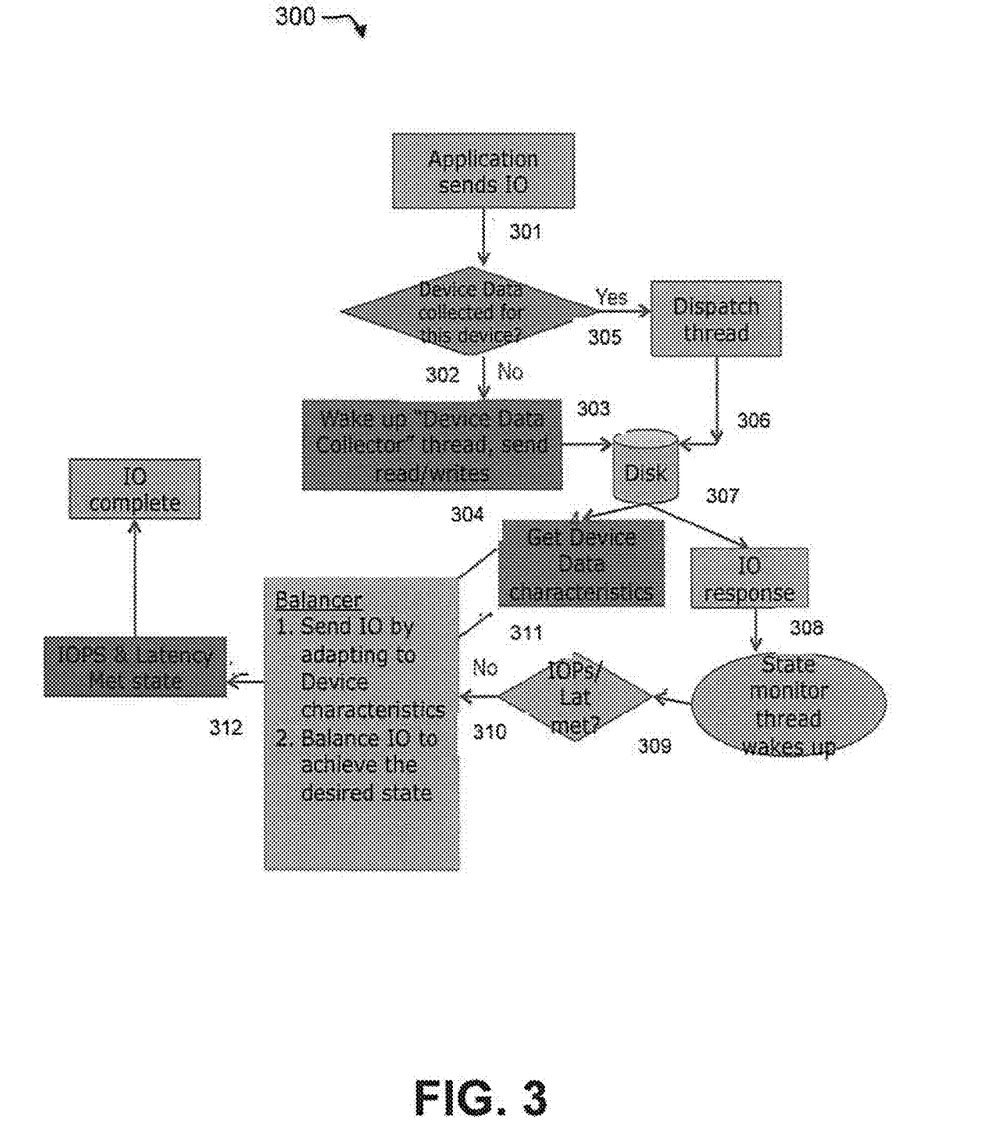
FIG. 3 illustrates the functional operation of the I/O balancer process of FIG. 2, under an embodiment.

FIG. 3 illustrates the functional operation of the adaptive and dynamic balancer process of FIG. 2, under an embodiment. The functional operation of diagram 300 is essentially a heuristic calibration process that optimizes read/write operations by taking into account certain storage device characteristics and the IOPs/latencies associated with the read/write operations. In particular read and write operations are reordered so that any delays due to writes are minimized for the read operations. As shown in diagram 300, an application sends I/O requests including read/write operations, 301. The process determines whether or not device data has been collected for the target storage device. If so, the I/O thread is dispatched 305 and the request is sent to the disk, 306. If not, the process wakes up a device data collector thread 302 and sends the read/write operations to the disk, 303. From the disk, the process receives device characteristics 304 and I/O response times 307. For the I/O response a state monitor thread is activated and the process determined whether or not IOPs and latency figures are met relative to defined optimum numbers, 309. If the IOPs and latencies are met, the I/O is optimized and the I/O is complete. Otherwise, the read/write balancer 124 is invoked 310. This balancer modifies the sends the I/O by adapting to the device characteristics and balances the I/O to achieve the desired state with respect to IOPs and latency figures 312. Upon achieving the balanced I/O the I/O is complete.

With respect to the functional diagram of FIG. 3, the IOPs and latency figures represent tunable characteristics that are used to optimize the I/O. The balancing process involves re-ordering the reads and writes within an I/O operation comprising a number of mixed reads and writes, changing the dispatch interval between successive writes (e.g., $W_1 \rightarrow W_2$), or changing the batch size of the successive read and write operations (e.g., $R_1R_2R_3W_1W_2$). The balancing process may also interleave reads and writes based on the relative sizes of the read and write operations, for example by interleaving reads with smaller write operations, and so on.

As shown for the embodiment of FIG. 1, the balancer component 112 includes a queue (Q) state monitor 120 that uses the queue states to adapt the balancer based on response characteristics from the storage devices, and balances mixed reads and writes to meet the desired performance numbers. In this process, a monitor thread is created which monitors the current state of a queue. The queue being monitored may be either the read or the write queue, and one queue at a time is monitored. If the I/O status is not in a desired state, the queue state monitor triggers a balancer thread to move the queue state from its current state to the desired state.

Figure 4:
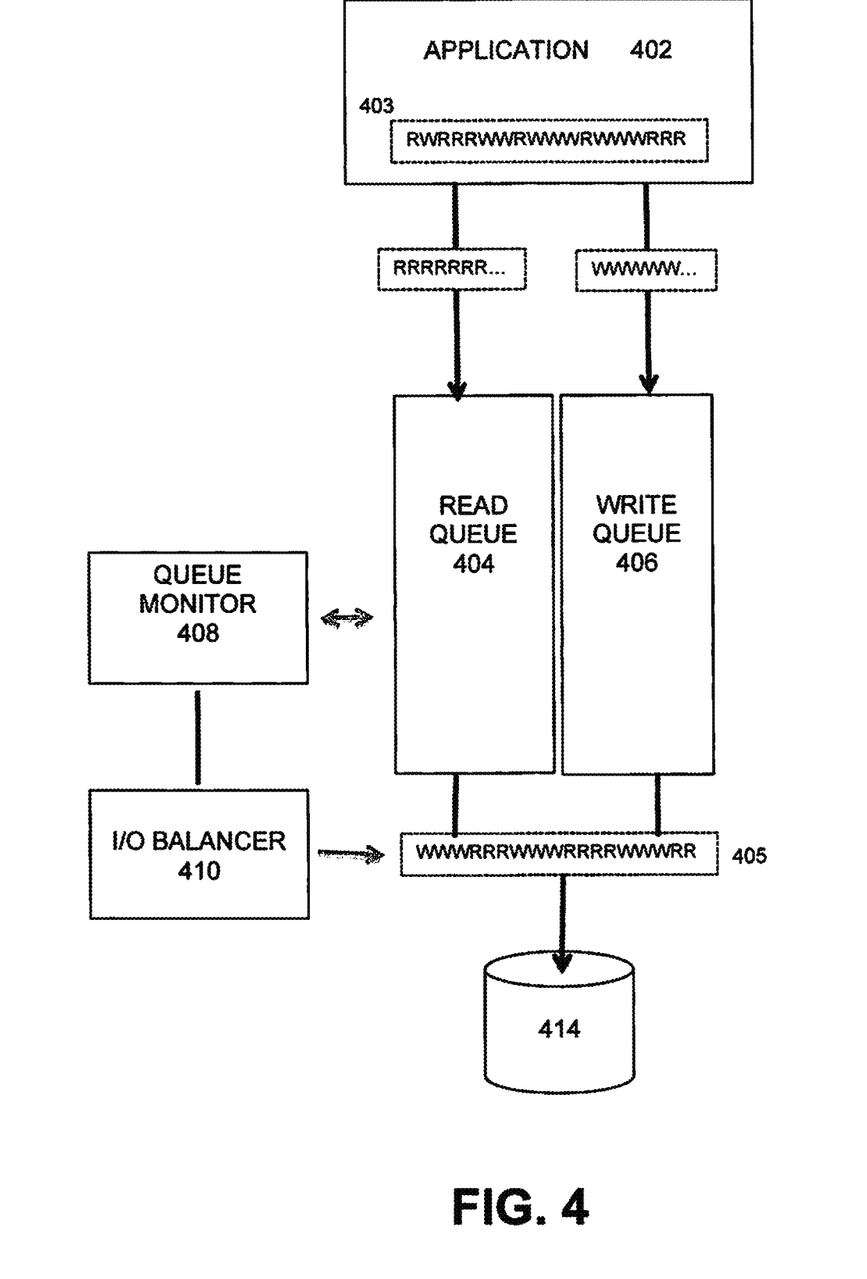
FIG. 4 illustrates the operation of read and write queues, under an embodiment.

FIG. 4 illustrates the operation of read and write queues, under an embodiment. As shown in FIG. 4, application 402 generates data access instructions 403 comprising I/O read (R) and write (W) operations in any appropriate sequence, as shown. The I/O from the application is divided into individual read the write queues so that the reads are sent to the read queue 404 and the writes are sent to the write queue 406. When filled, these queues combined represent a single read/write pending queue. A queue monitor 408 monitors the current state of the pending queue. Based on analysis of desired IOP/latency figures, and characteristics of the storage device 414, an I/O balancer 410 picks individual read and writes are from the pending queue and dispatches them to the storage device 414. A balancing process or algorithm is applied to the dispatcher process of the I/O balancer based on the current state to move to the desired state.

Figure 5:
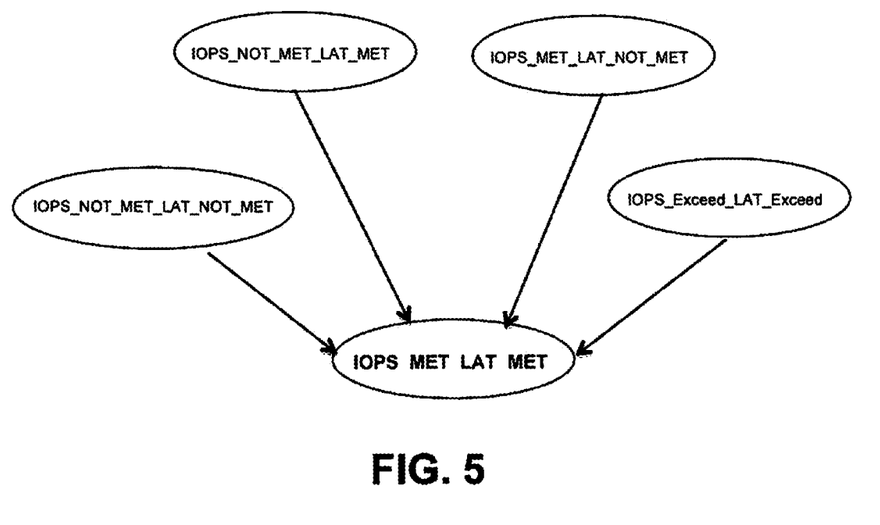
FIG. 5 is a state machine diagram that illustrates the transition to the desired Q state from different possible pending Q states.

With respect to the desired I/O parameters of IOPs and latency, there are a number of different queue states (Q states) which are set and changed dynamically. The following are example possible Q states for the read and write operations:
READ_IOPs_MET_LAT_MET
READ_IOPS_MET_LAT_NOT_MET
READ_IOPS_EXCEED_LAT_EXCEED
READ_IOPs_EXCEED_LAT_NOT_EXCEED
WRITE_IOPs_MET_LAT_MET
WRITE_IOPS_MET_LAT_NOT_MET
WRITE_IOPS_EXCEED_LAT_EXCEED
WRITE_IOPs_EXCEED_LAT_NOT_EXCEED
WRITE_IOPs_MET_LAT_EXCEED
For each queue, the queue state will transition from a current state to the desired state when the IOPs and latency conditions are met. Using the above Q state terminology, the desired state can be expressed as: IOPs_MET_LAT_MET. FIG. 5 is a state machine diagram that illustrates the transition to the desired Q state from different possible pending Q states. Diagram 500 illustrates different pending Q states without specifying read or write operations, but it should be understood that this state machine diagram represents transitions for both the read and write queues within the pending queue. Other pending Q states may also be included depending on system and application requirements.

Figure 6:
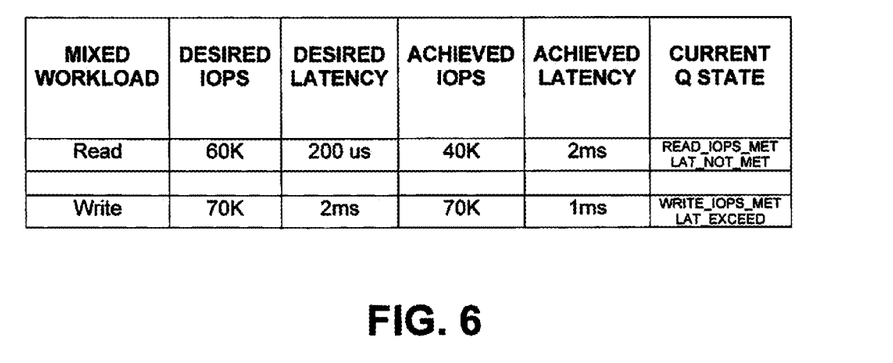
FIG. 6 is a table that illustrates an example pending Q state table under an embodiment.

For each of the read and write operations, the pending Q states are expressed in terms of desired IOP and latency figures as compared to achieved IOP and latency figures. The IOP figure may be expressed as data throughput in KB or MB units and the latency may be expressed as millisecond (ms) or microsecond (µs) time unit. FIG. 6 is a table that illustrates an example pending Q state table under an embodiment. The table of FIG. 6 is intended to be an example only and representative of a portion of a Q state table under some embodiments.

Under an embodiment, the dynamic I/O balancer 112 includes a device data collector 122 that is and activated for every disk (data storage device) discovery. Device characteristics depend largely on the make, model, and type of storage device. For example, access times for SSD devices is generally faster than that of HDD devices, though their storage capacities are typically lower, and within each type of device different models may have significantly different access times depending on cost, design, application and so on. These characteristics are determined by the process so that the I/O operations can be tailored to specific types of devices and different types of devices can be accommodated accordingly.

Figure 7:
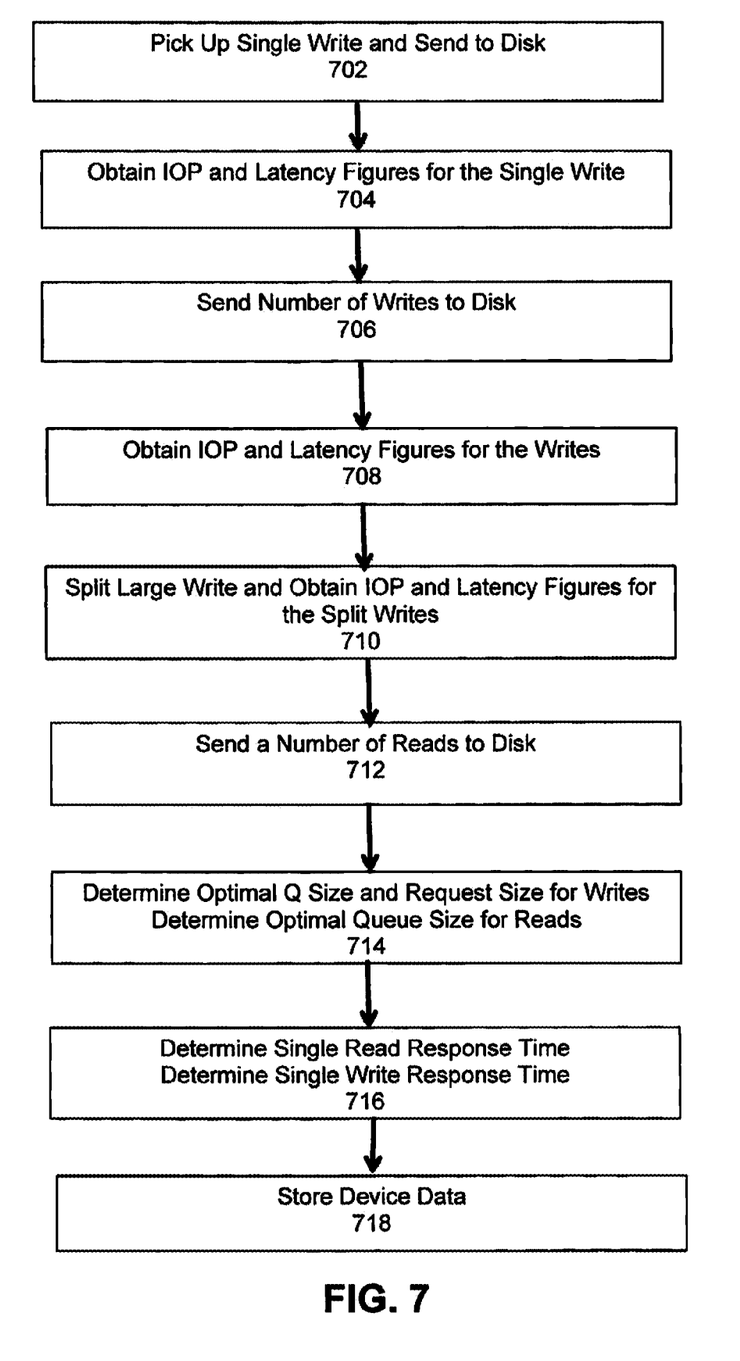
FIG. 7 is a flowchart that illustrates a method of collecting device characteristics under an embodiment.

When an application sends I/O to the disk, the first set of I/Os are picked up by this thread for collecting the necessary device data. This device data information (device characteristics) is required to balance the reads and writes in the balancer process 410. The device characteristics inform the process as to how the device behaves for various workloads, in order to help determine the optimal pending queue size, response times and request sizes. The device data that is collected is applied in the read/write balancer logic 124 to efficiently balance reads and writes. FIG. 7 is a flowchart that illustrates a method of collecting device characteristics under an embodiment. As shown in FIG. 7, the process starts with a single write being picked up by the device data collector logic component and then being sent to disk, block 702. The process then gets the IOPs and latency for this write operation, block 704. After the figures for the single write are obtained, the process sends a number of write operations with various queue depths to the disk, block 706, and obtains the IOP and latency figures for these write operations, block 708. A large write operation is then split into a number of individual writes, and the IOPs and latency figures for the split writes are then obtained, block 710. The size of the "large" write can be determined by a pre-defined threshold value specifying a minimum size of a large write operation. Next, read operations are sent to the disk, block 712. For the write operations, the optimal queue size and request size are determined, and for the read operations, the optical queue size is determined, block 714. The process then determines the single read response time and the single write response time, block 716. These determined metrics define the device data for the disk (or other storage device) that is then stored for later processing as needed, block 718.

Figure 8:
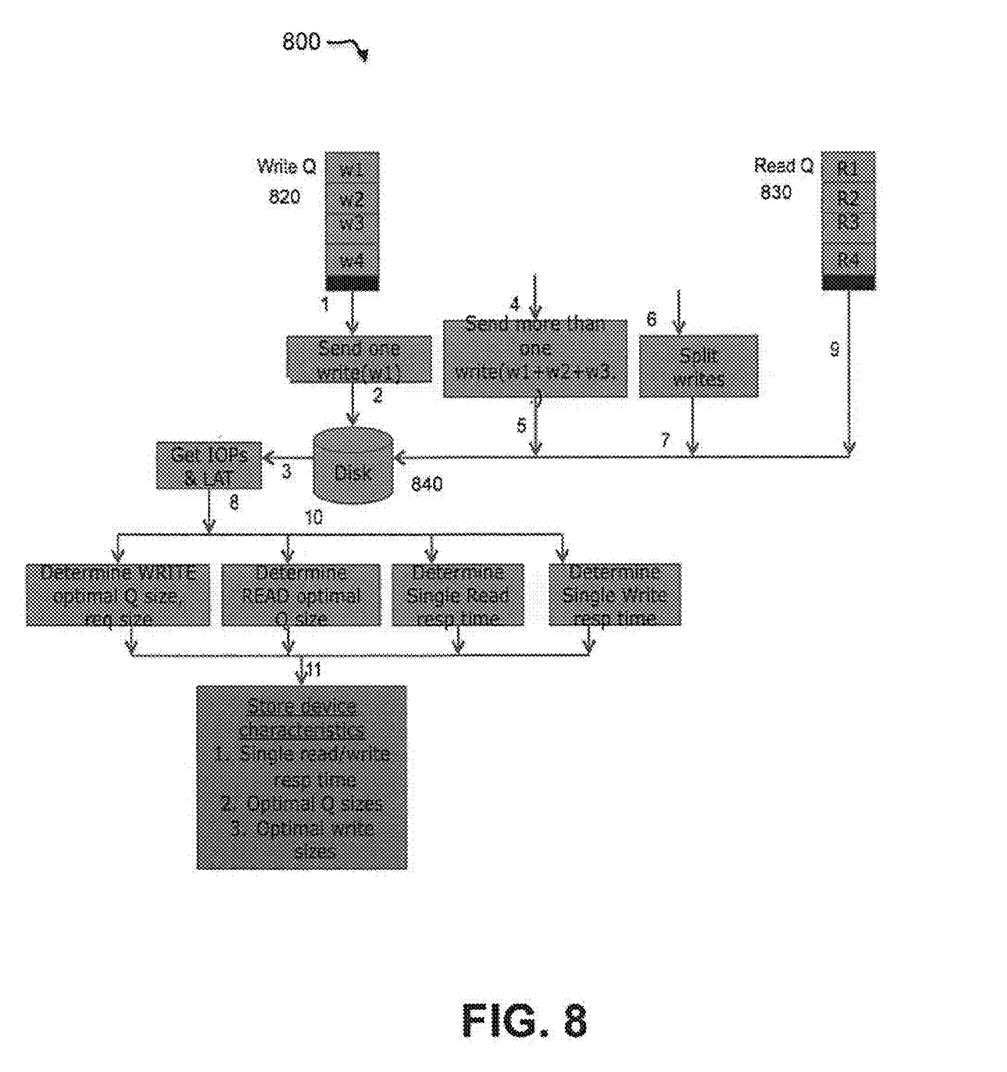
FIG. 8 illustrates the functional operation of the device data collector process of FIG. 7, under an embodiment.

The process of FIG. 7 represents a device data collector processing thread that is executed or implemented by a processor-based device data collector component that may be incorporated in or associated with the dynamic I/O balancer 112. FIG. 8 illustrates the functional operation of the device data collector process of FIG. 7, under an embodiment. As shown in diagram 800 a write queue 820 and a read queue 830 are processed by a number of operations for access to and from disk 840. The write queue sends a single write, step 1, which sent to disk, step 2. The disk then sends this write so that the process can get IOP and latency figures, step 3. In step 4, multiple other writes are sent, along with split writes step 6. The multiple and split writes are provided to the disk in steps 5 and 7. Read operations are provided to the disk by the read queue in step 9. The step 3 of getting IOPs and latencies is repeated after the multiple writes, split writes and reads are sent to the disk in steps 5, 7, and 9. The resulting IOP and latency figures are then sent to the I/O balancer process in step 10 to determine the single read and write response times, and to determine the read optimal queue size and the write optimal queue size and request size. The device characteristics are then stored in step 11.

Figure 9:
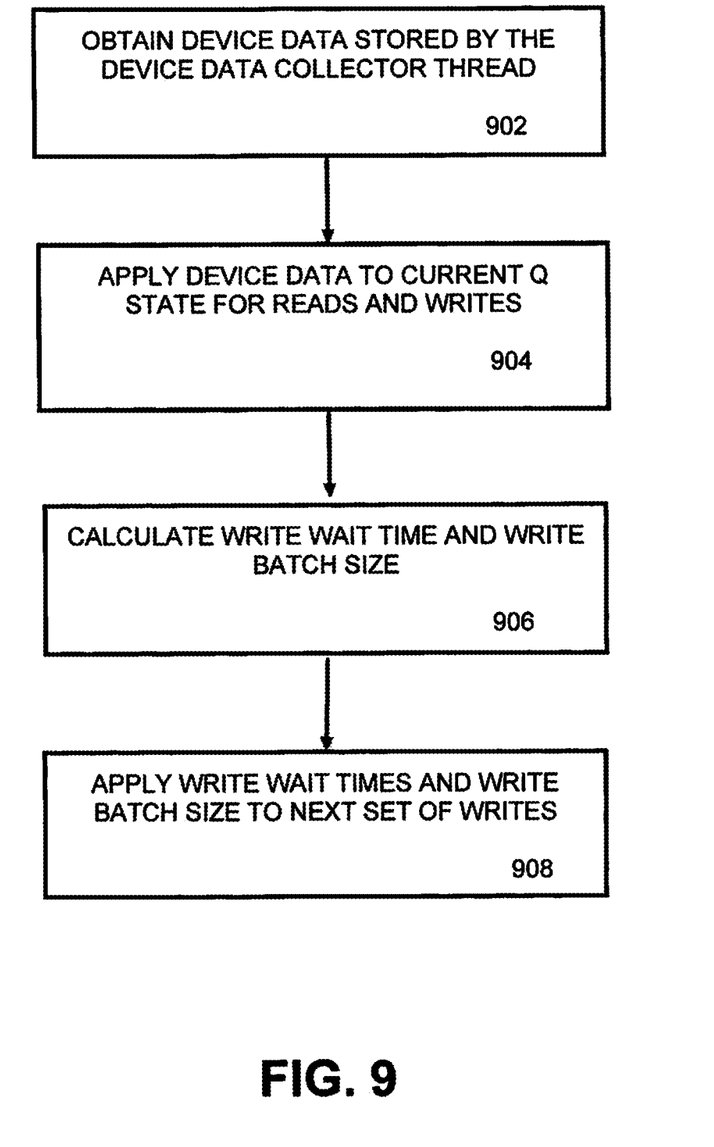
FIG. 9 is a flowchart illustrating a method of performing R/W balancing, under an embodiment.

Once the device data has been collected by the device data collector 122 an adaptive and dynamic read/write balancer 124 balances the mixed reads and writes to meet the desired latencies and IOP figures. The balancer operates on the mixed reads and writes where the writes take over or detrimentally impact the read service times. The reads and writes arrive to a dispatch thread, and the dispatch thread calls a balancer function of the R/W balancer 124. The role of the balancer function is to move the current Q state of read/write to the to desired IOPS_MET_LAT_MET state. FIG. 9 is a flowchart illustrating a method of performing R/W balancing, under an embodiment. The balancer first gets the device data which was stored using device collector thread, block 902. This data is then applied accordingly to the current Q state for the reads and writes, block 904. The process then calculates the write wait time and write batch size, block 906, and applies the write wait time and write batch size to next set of writes to accommodate the reads, block 908. This results in both reads and writes being balanced efficiently and the Q state reaching the IOPS_MET_LAT_MET state.

As shown in FIG. 9, block 906, one function of the balancer is to calculate the write wait time. In an embodiment, this is performed by the functions:

$$WRw = WRc + Ew$$

$$Ew = CR1 - ER1$$

$$Result = WRw$$

In the above equations, WRw is the write wait time, WRc is the write current time, Ew is the extra wait time for write, CR1 is the current read latency, ER1 is the expected read latency, and WRw is the write wait time.

Figure 10:
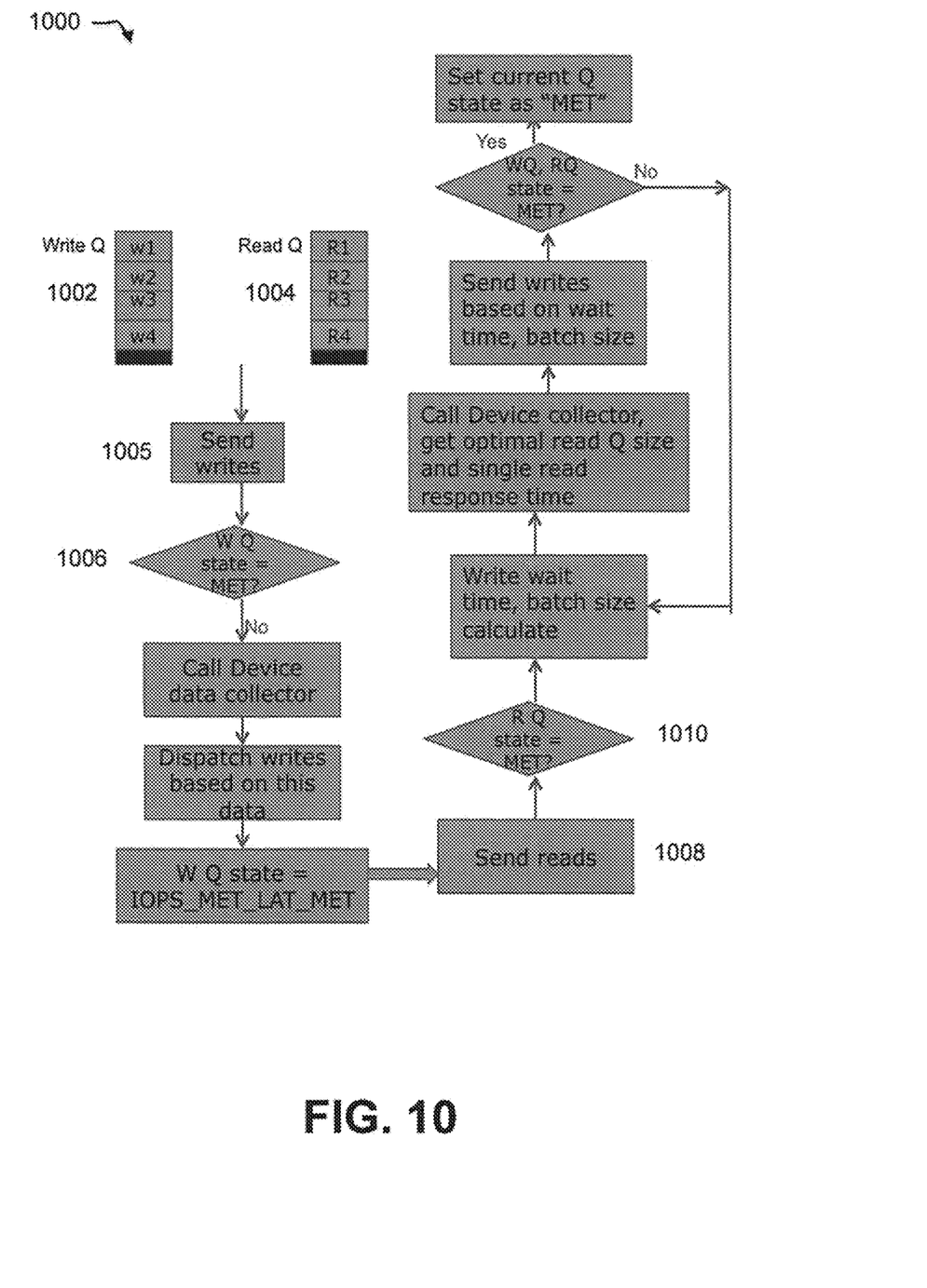
FIG. 10 illustrates the functional operation of the R/W balancer process of FIG. 9, under an embodiment.

FIG. 10 illustrates the functional operation of the balancer process of FIG. 9, under an embodiment. Diagram 1000 illustrates functional processes within execution of the three main balancer steps (1) sending and processing writes, (2) sending and processing reads, and (3) applying wait time, batch size and device characteristics to reach the optimum Q state. With respect to the first main balancer step, the process sends writes to the disk from the write queue 1002 in step 1005. This results in the Q state being in either a "NOT_MET" state or a "MET" state as determined in block 1006. If it is in a "MET" state, then balancer will not be applied. If, however, the current Q state is in a "NOT_MET" state, the process calls the device data thread to get optimal write Q size, IOPs and response times. For write requests, the process dispatches write requests based on the device data characteristics. This results in "Write Q state"="IOPS_MET_LAT_MET".

For the second main balancer step, the process, in step 1008, sends reads to the disk from the read queue 1004 and checks the response, step 1010. If the response state is "IOPS_MET_LAT_MET", the balancer is not applied. If not, then balancer has to calculate the "wait time" and "batch size" to send writes so that reads get the appropriate service time. In this case, more time must be given to reads by taking some time out of writes. The process must also ensure that writes are still in "IOPS_MET_LAT_MET" state.

For the third main balancer step, the process applies the write wait time, batch size and device characteristics history. While the writes Q state equals the optimum IOPS_MET_LAT_MET, the process calculates write wait time, write batch size. It then applies the write wait time (Ew). If the reads state is now "READ_IOPS_MET_LAT_MET," then the process is complete. Otherwise, the process calls the device data collector to get possible write Q size and read Q size and sets the write batch size (WRbz) to get desired IOPS and latencies. The next writes will be sent in WRbz and with delay of Ew. The process modifies the WRbz and Ew values until the writes and reads are both at the IOPS_MET_LAT_MET Q state.

Figure 11:
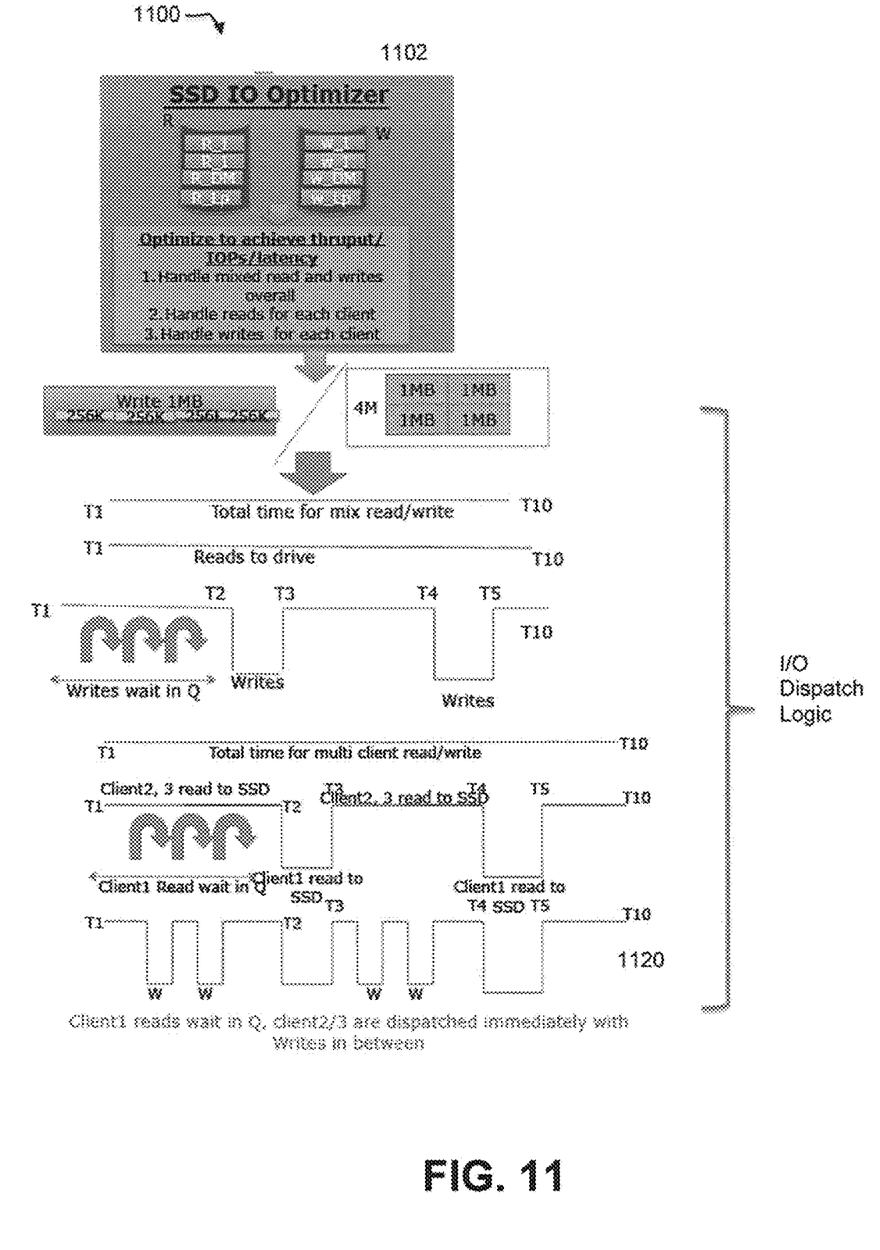
FIG. 11 illustrates the functional operation of an I/O balancer dispatch process for an SSD target device, under an embodiment.

As stated earlier, the target data storage device accessed by the application through I/O read/write operations may be any appropriate device such as a hard disk (disk or HDD) or solid state memory device (SSD). Although embodiments may be described with respect to the target storage device referred to as a "disk" it should be noted that such devices may also be embodied as SSD devices. FIG. 11 illustrates the functional operation of an I/O balancer dispatch process for an SSD target device, under an embodiment. System 1100 includes an SSD I/O optimizer 1102 that contains a read queue and a write queue. The composition of each queue is as follows:

R_I: Index Read
W_I: Index Write
R_Lp: Lp read
W_LP: Lp write
R_DM: DM read
W_DM: DM write The SSD I/O optimizer 1102 is configured to balance each client read and write operation to achieve the desired performance numbers, and handles mixed reads and writes and reads and/or writes for each client of a plurality of different clients. In FIG. 11, writes are shown as organized in a 1 MB block with 256K chunks or a 4 MB block with 1 MB chunks. The writes are coalesced or split based on the internal SSD buffer capabilities. FIG. 11 shows various timing diagrams for read and write periods for example time segments from T1 to T10. The balancer process can re-order and re-arrange the read and write operations based on the device characteristics and optimum IOP and latency figures per the algorithms and processes described above. For the example shown in FIG. 11 various different clients perform I/O operations to the target SSD and the reads and writes are sent to the I/O dispatch logic per the timings shown. For example, the reads from client 1 may wait in the read queue while the client 2 and 3 reads are dispatched immediately with certain write operations interleaved in between, as shown in timing diagram 1120.

Embodiments of the I/O balancer process can be extended with multiple reads and writes clients in parallel and balance reads and writes accordingly. Mixed reads and writes are common workloads and needs to be balanced to improve read latencies and IOPs and at the same time maintain the write performance. The dynamic read/write I/O balancer solves this problem by balancing out both reads and writes. The I/O balancer 112 processes are configured to operate as background processes that operate in the I/O context of the data storage server. The device characteristics and queue monitor do not impact any of the I/O performance, and none of the processes significantly impact any of the application I/O performance.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of optimizing input/output (I/O) operations to a storage device having mixed read and write operations, comprising:
   determining a current queue state for the read and write operations with respect to defined optimum values of I/O operations per second (IOPS) and latency for the I/O operations;
   determining device characteristics of the storage device by determining read/write response times, queue depths and dispatch time intervals for an initial read/write operation; and
   modifying at least one of a wait time or batch size for subsequent read/write operations to meet the defined optimum values of IOPS and latency.

2. The method of claim 1 further comprising maintaining a read queue for the read operations and a write queue for the write operations.

3. The method of claim 2 wherein the step of modifying is performed at least in part by batching at least some read operations together and batching at least some write operations together to match a respective optimal batch size.

4. The method of claim 2 wherein the step of modifying is performed by at least in part by interleaving at least some read operations between some write operations depending on a respective size of the read and write operations.

5. The method of claim 2 wherein the step of modifying is performed at least in part by changing an I/O dispatch time of at least some of the read or write operations to hold those operations in their respective read queue or write queue.

6. The method of claim 1 wherein the optimum values are defined by an application issuing the I/O operations from a client computer accessing the data storage device.

7. The method of claim 1 wherein the read and write operations are generated by one of: a plurality of applications executed by a client computer, and a plurality of applications executed by a plurality of client computers.

8. The method of claim 1 wherein the storage device comprises one of a hard disk device and a solid state disk device.

9. A system for optimizing input/output (I/O) operations to a storage device having mixed read and write operations, comprising:
   a queue having a queue state and comprising a read queue structure for read operations and a write queue structure for write operations;
   a queue state monitor determining a current queue state for the read and write operations with respect to defined optimum values of I/O operations per second (IOPS) and latency for the I/O operations;

a device data collector determining device characteristics of the storage device by determining read/write response times, queue depths and dispatch time intervals for an initial read/write operation; and a balancer component modifying at least one of a wait time or batch size for subsequent read/write operations to meet the defined optimum values of IOPS and latency.

10. The system of claim 9 wherein the queue state monitor determines whether the current queue state indicates whether or not read/write IOPS meet, do not meet, or exceed a defined optimum IOPS value, and whether or not read/write latencies meet, do not meet, or exceed a defined optimum latency value.

11. The system of claim 10 wherein the device data collector is activated for every device discovery operation and sends an initial I/O operation to the storage device to determine IOPS and latency for a plurality of queue depths and IOPS and latencies for single and split writes.

12. The system of claim 11 wherein the device data collector further determines single read response time and optimal queue size for read operations.

13. The system of claim 12 wherein the balancer component receives device characteristic information from the device data collector and a current queue state from the queue state monitor and performs the modifying until the current queue state achieves an optimum state wherein the IOPS meet or exceed the defined optimum IOPS value and the latencies meet or exceed the defined optimum latency value.

14. The system of claim 13 wherein modifying is performed by the balancer at least in part by one of:

batching at least some read operations together and batching at least some write operations together to match a respective optimal batch size;

interleaving at least some read operations between some write operations depending on a respective size of the read and write operations; and changing an I/O dispatch time of at least some of the read or write operations to hold those operations in their respective read queue or write queue.

15. The system of claim 13 wherein the optimum values are defined by an application issuing the I/O operations from a client computer accessing the data storage device, and wherein the read and write operations are generated by one of: a plurality of applications executed by a client computer, and a plurality of applications executed by a plurality of client computers.

16. The system of claim 9 wherein the storage device comprises one of a hard disk device and a solid state disk device.

17. The system of claim 16 wherein device characteristics depend on a make and model of the target storage device.

18. A computer program product, comprising a non-transitory computer-readable medium having a computer-readable program code embodied therein, the computer-readable program code adapted to be executed by one or more processors to optimize input/output (I/O) operations to a storage device having mixed read and write operations, comprising:

determining a current queue state for the read and write operations with respect to defined optimum values of I/O operations per second (IOPS) and latency for the I/O operations;

determining device characteristics of the storage device by determining read/write response times, queue depths and dispatch time intervals for an initial read/write operation; and modifying at least one of a wait time or batch size for subsequent read/write operations to meet the defined optimum values of IOPS and latency.

* * * * *